Aug. 22, 1967  G. E. HART  3,337,845
HEADS-UP DISPLAY FOR PILOTS
Filed Feb. 26, 1965  3 Sheets-Sheet 2

INVENTOR
GERALD E. HART

BY
ATTORNEY

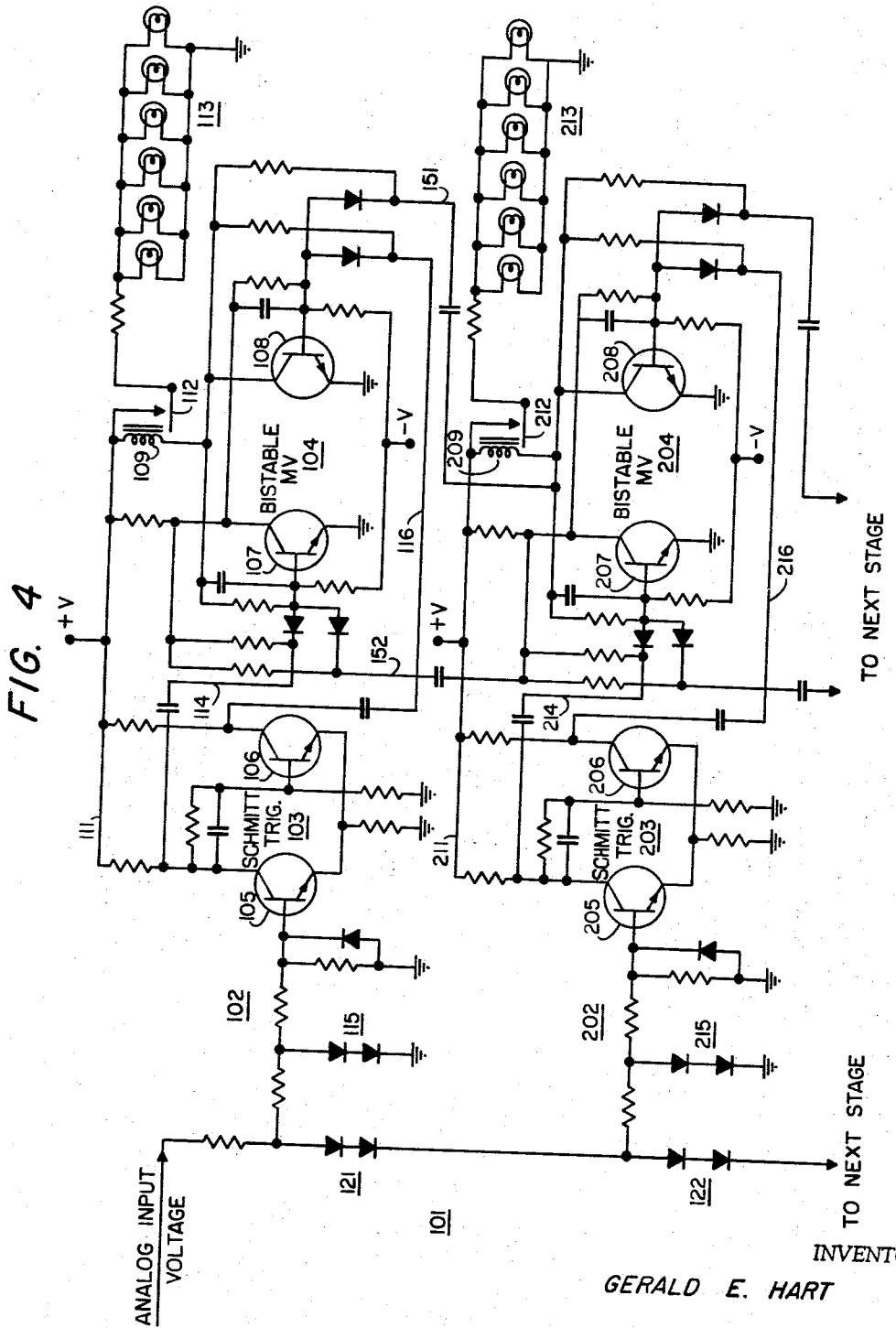

United States Patent Office 3,337,845
Patented Aug. 22, 1967

3,337,845
HEADS-UP DISPLAY FOR PILOTS
Gerald E. Hart, Washington, D.C., assignor to the United States of America as represented by the Secretary of the Navy
Filed Feb. 26, 1965, Ser. No. 435,757
16 Claims. (Cl. 340—27)

ABSTRACT OF THE DISCLOSURE

A display device which presents flight information while allowing the pilot to maintain normal visual contact with external objects. Display consists of transparent panel of a width less than the pilot's interpupillary distance in which panel light sources are positioned. The light sources are controlled by flight instrumentation.

---

The invention described herein may be manufactured and used by or for the Government of the United States of America for governmental purposes without the payment of any royalties thereon or therefor.

This invention relates to display systems, and more particularly to display systems for visually conveying to the pilot various conditions relating to an aircraft approach flight while the pilot is focusing on a distant object.

Those concerned with the development of aircraft display systems have long recognized the need for an inexpensive display apparatus which is sufficiently narrow so that the pilot may always have one eye in the clear and the other eye capable of seeing through the display when focusing at distant objects. Previous systems employ relatively expensive projection techniques wherein the display is projected into the pilot's normal field of view so that he may look straight through the windscreen while observing the display. Most of the display techniques employ projection onto a half-silvered mirror via a system of lenses and mirrors.

The term "heads-up display" normally refers to a transparent display panel situated directly between the pilot and the windscreen and permits the pilot to scan vital instruments while looking straight ahead at visual cues or the landing area. Heads-up displays are normally collimated so that they will appear to be focused at infinity. This enables the pilot to readily shift his focus between the display and distant objects without eye strain or loss of time due to accommodation. However the optics required for collimation is quite expensive and the combination of projection tube and optics occupies considerable space in an area where space is extremely critical. Among the disadvantages of most heads-up displays is the so-called "tunnel vision" problem which results from the very restricted field of vision caused by the collimated display, which, in turn, restricts the pilot's freedom of movement around the cockpit. Furthermore, the pilot can look only in one direction while observing the display. This limitation becomes especially trying when the pilot has to make a course correction in which the axis of the aircraft is turned away from the direction of the runway. In this case, the pilot must choose between the display and external visual cues.

The general purpose of this invention is to provide a heads-up display system that provides important advantages over similarly employed systems while avoiding their disadvantages. The present invention eliminates the collimation and projection requirements of prior art systems. Furthermore, the flexibility of this invention eliminates the "tunnel vision" problem which is a disadvantage of most heads-up displays. By means of the heads-up display of this invention, the pilot may move his head freely around the cockpit while continually viewing the display. To attain this the present invention provides a display system including a transparent display panel whose width is less than the interpupillary distance of the pilot and having a plurality of light sources positioned in apertures in the display panel for imparting visual information to the pilot while he is maintaining a continuous watch through the windscreen. The width of the panel is such that when the pilot focuses on distant objects one eye is completely unobstructed as the other eye looks through the transparent panel while observing the information displayed. The displayed information usually relates to the position of the aircraft relative to a reference approach flight path including vertical and lateral deviations together with pitch and roll attitude. This display information may either be generated directly on the panel or reflected from the panel onto a dichroic mirror if the panel is horizontal. The system also provides an analog-to-digital converter for transforming the landing information, which is received from the aircraft instrumentation in the form of analog signals, into digital signals which energize and illuminate light sources in a first display configuration incrementally at a selected brilliance so that horizontal and lateral deviations from the reference approach path are optically displayed in a thermometer-like manner. Light sources in a second display configuration are energized sequentially to indicate pitch and roll attitude.

An object of the present invention is the provision of a visual display system which requires a minimum of space and associated electronics and which is simple, reliable, flexible, inexpensive and easily maintained.

Another object of the invention is the provision of an inexpensive display system for conveying landing information to the pilot of an aircraft without the necessity of employing projection and collimation techniques.

A further object is to provide a display panel for conveying visual information to the pilot of an aircraft which is small enough to allow one of the pilot's eyes to be completely in the clear and unobstructed by the display and which allows the other eye to see through the display when focusing at distant objects while the display information is observed without an appreciable reduction in outside visibility.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 4 is a schematic diagram of a circuit for controlling the bank-indicating lights.

Figure 1:
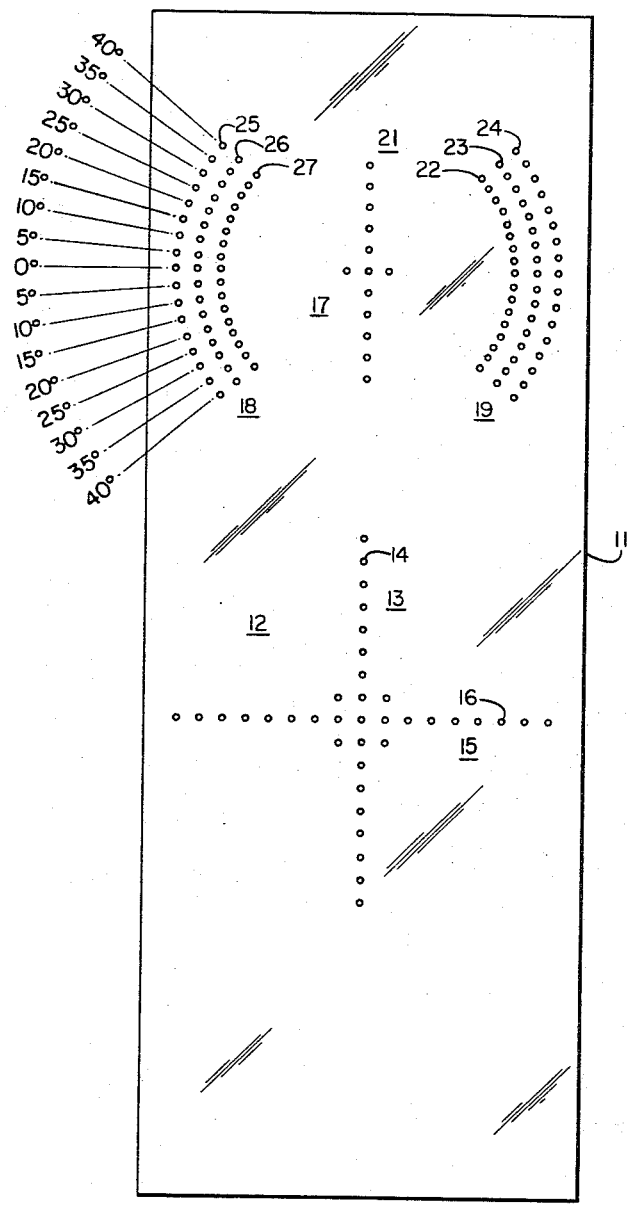
FIG. 1 is a front view of the display panel of this invention.

Referring now to the drawings, there is shown in FIG. 1, a transparent display panel 11 made of clear glass or Lucite and having a first display configuration 12 located approximately in the center of panel 11 and comprising a vertical column 13 of apertures 14 intersecting a horizontally aligned row 15 of apertures 16. A second display configuration 17 is located at the top of panel 11 and comprises two symmetrical semicircular groups 18 and 19, with each group having three series of light sources 22–24 and 25–27, respectively, positioned in their associated apertures. Each group is located on each side of a vertically aligned column of light sources 21 positioned in their respective apertures. The apertures in each semicircular group are located 5° apart and cover the 40 degrees above and below a zero-degree aperture position. Light sources of series 22–24 and 25–27 which, are positioned in these apertures, will indicate roll or bank angles up to 40 degrees. Of course, other angular markings or groups of light sources may be used if desired. The vertical column of light sources 21 indicates the pitch of the aircraft.

The display configuration 17 also has a pair of apertures, one on each side of the zero position aperture of column 21 for receiving lights or bulbs which are always illuminated when the device is in operation in order to effectively indicate the zero position of that configuration. In display configuration 12, marker lights are employed at both ends and on each side of the vertical column 13 and horizontal row 15. Marker lights are also positioned around the point of intersection of column 13 and horizontal row 15 as shown in display configuration 12. The marker lights throughout the display are usually maintained in the illuminated state so that various reference positions are displayed. A separate variable voltage source may be used to energize the marker lights at a selected brilliance.

The transparent panel 11 is critically dimensioned in width so as to be less than the distance between the pilot's eyes. Since the normal interpupillary distance is approximately 2½ inches, the width of the panel is approximately 2¼ inches. Extremely small incandescent lamps employed as the light sources are positioned in the apertures throughout the panel. The bulbs are approximately 0.030 inch in diameter, 1/16 inch in length, are equally spaced approximately one millimeter apart, and are secured in their respective apertures by an appropriate binder. A suitable incandescent lamp to be employed in this invention is the "Pinlite" bulb commercially available from Kay Electric Co.

The width of the transparent panel, as referred to in this specification, indicates the lateral or horizontal dimension of the panel as viewed from the position of the pilot when he is looking straight ahead through the windscreen. The panel length, or vertical dimension with respect to the pilot, is not critical and should only be sufficient to contain the desired number of display configurations which are arranged vertically with respect to one another on the panel. The panel thickness should be such that the bulbs are adequately protected and enclosed. The bulbs are 1/16 inch in length and should be slightly below the surface of the panel face nearest the pilot. The bulb leads will extend through the face of the panel nearest the windscreen.

Figure 3:
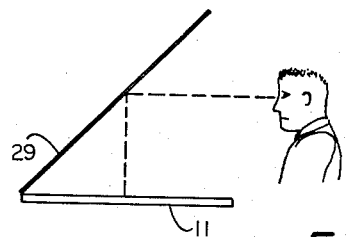
FIG. 3 is a diagram of the display panel in a horizontal position used in conjunction with a dichroic mirror.

Display panel 11 may also be fixed on the aircraft instrument panel in a horizontal position, if desired, provided that a reflecting means 29, such as a dichroic mirror, is mounted at an angle of approximately 45 degrees with respect to the panel as illustrated in FIG. 3. The display image is thereby projected into the pilot's normal field of view.

Figure 2:
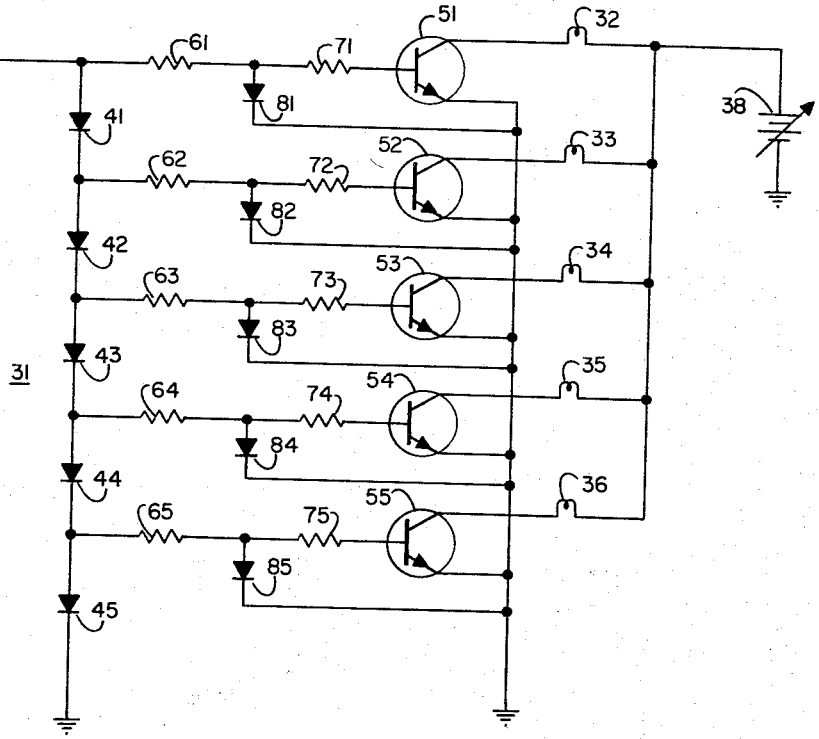
FIG. 2 is a circuit diagram of the analog-to-digital converter for controlling the lights indicative of the vertical and horizontal deviations, as well as the aircraft pitch.

FIG. 2 is a circuit diagram of an analog-to-digital converter 31 which is suitable for controlling the lights of column 13 and row 15 of display configuration 12. Two converters are employed in the system, one for column 13 and the other for row 15. For purposes of description, only one converter 31 is shown in FIG. 2 for controlling a typical array of lights 32–36. Converter 31 receives from the aircraft instrumentation 47 an analog signal representative of the information to be displayed and sequentially and progressively illuminates lights 32–36 in a thermometer-like fashion. The analog-to-digital converter 31 comprises a column of diodes 41–45 serially connected to receive the analog signal and to incrementally apply a portion of the signal to each of bulbs 32–36. As the signal voltage rises from a zero reference, transistor 51 conducts when the signal is applied through resistors 61 and 71 thereby energizing bulb 32. A further increase in signal voltage causes diode 41 to conduct and the full signal voltage is applied through resistors 62 and 72 to the base of transistor 52, causing it to conduct, thereby energizing bulb 33 while transistor 51 continues to conduct. As the signal level rises above the breakdown voltage of diode 81 it conducts and clamps the voltage applied to the base of transistor 51 to a reasonable and safe level. As the signal voltage continues to rise, diodes in the column 41–45 break down sequentially, thus turning on the transistors and the light bulbs sequentially as the signal is applied through resistors 63–65 and 73–75. Each bulb 32–36 of the array is connected between the collector of its associated transistor 51–55 and a voltage source 38 which is variable to control the brilliance of the bulbs. As the signal voltage decreases, the last transistor to conduct is turned off thereby extinguishing its associated bulb. The increase and decrease in the analog signal input therefore produces a thermometer-type effect wherein the lights are not extinguished as the voltage rises to trigger the next-succeeding transistor but remain in the illuminated condition to form a variable column of lighted bulbs. However, when the applied analog signal decreases, the bulbs are extinguished in reverse order so that the column recedes until all bulbs are extinguished.

Pitch indicating lights 21 are illuminated sequentially with only a single bulb in the illuminated condition at any given time. Bank indicators 18 and 19 will also be illuminated sequentially in groups of six so that only one bulb in each of the semicircular series of bulbs 22–27 will be illuminated at any given time. The six lighted bulbs form a straight line through the center of column 21, wherein a reference bulb, marking that center position, remains illuminated at all times.

A suitable solid state switching circuit for controlling the bank indicating lights or the pitch indicating lights of display configuration 17 is shown schematically in FIG. 4. The circuit for controlling the bank indicating lights comprises a plurality of switching stages, one for each group of lights composed of one light from each of the series 22–27 of FIG. 1. For purposes of explanation, only two stages, 102 and 202, are shown. Each group of six lights indicates a particular bank angle between 40° and −40° as illustrated in configuration 17 of FIG. 1 so that 17 stages would be required. The circuit for controlling the pitch indicating lights is structurally the same as the circuit for controlling the bank indicating lights. However only a single bulb is at the output of each stage rather than six as shown in FIG. 4.

Each switching stage is the same as stage 102 and essentially comprises a conventional Schmitt trigger circuit 103 which is connected to trigger a conventional bistable multivibrator, or flip-flop, 104. Schmitt trigger 103 has two NPN transistors 105 and 106 each of which has its collector coupled to one of the two NPN transistors 107 and 108, respectively, of bistable multivibrator 104. Schmitt trigger 103 is ON when transistor 105 conducts, and is OFF when transistor 106 conducts. A relay coil 109 is coupled between the collector of transistor 108 of bistable multivibrator 104 and a source of voltage 111 so that relay coil 109 is energized to close contact 112 when transistor 108 is turned ON. When relay contact 112 is closed, a voltage source 111 is connected to a group 113 of six bulbs which are aligned at a particular bank angle.

In addition to the series of stages, the circuit 101 comprises a series of diode pairs 121 and 122 connected to receive the analog input signal which is indicative of the bank angle. As the analog signal voltage rises from a zero reference, transistor 105 of Schmitt trigger 103 turns ON so that the collector voltage of transistor 105 drops to produce a negative-going signal on line 114 which turns OFF transistor 107 and turns ON transistor 108. While transistor 108 conducts, relay coil 109 is energized thereby closing contact 112 so that a voltage is applied to illuminate lights 113. When the signal level rises above the breakdown voltage of diode pair 115, diode pair 115 conduct and clamp the voltage applied to the base of transistor 105 to a safe level.

A further increase in analog signal voltage causes diode pair 121 to conduct and the full signal voltage is applied to the base of transistor 205 causing it to conduct so that a negative-going pulse is applied through line 214 to turn OFF transistor 207 to flip-flop 204 and turn ON transistor 208 thereby energizing relay coil 209. Contact 212 is thereby closed to apply a voltage to lights 213. When transistor 208 of bistable multivibrator 204 is in the ON condition, a negative-going pulse is applied via line 151 to the base of transistor 108 of bistable multivibrator 104 to turn OFF bistable multivibrator 104. The collector voltage of transistor 108 rises so that relay coil 109 is deenergized thereby opening contact 112 to extinguish lights 113. Lights 213 are then in the ON condition while lights 113 are OFF. As in stage 102, when the signal level for stage 202 rises above the breakdown voltage of diode pair 215, diode pair 215 conduct and clamp the voltage applied to the base of transistor 205 to a safe level. As the analog signal continues to rise, the above operation is repeated for each succeeding switching stage.

As the analog input voltage decreases, the reverse operation is initiated when voltage decrease occurs which is sufficient to cause Schmitt trigger 203 of stage 202 to be turned OFF, i.e., transistor 205 is biased OFF, and transistor 206 is biased into conduction. A resulting negative-going pulse on line 216 is applied to transistor 208 of bistable multivibrator 204 thereby turning OFF transistor 208 so that its collector voltage rises to deenergize relay coil 209 thereby opening contact 212 and extinguishing lights 213. Concurrently, transistor 207 is turned ON and a negative-going signal is applied via line 152 to turn OFF transistor 107 of bistable multivibrator 104 of the previous stage. When transistor 107 is turned OFF, transistor 108 is turned ON thereby causing lights 113 to be illuminated, while lights 213 are now extinguished. The above operation occurs for each switching stage as the analog signal input voltage continues to decrease. When the analog signal approaches the zero reference, Schmitt trigger 103 is turned OFF whereby a negative-going signal is applied via line 116 to turn OFF bistable multivibrator 104 to extinguish lights 113 of the last stage 102.

The switching unit described above is one of several possible means for controlling the lights of the bank and pitch indicators. Other suitable means include a rotating drum with sliding brush contacts, a frictionless switching arrangement utilizing magnetic reeds in place of brushes, or a rotating light source for activating successively a circular row of photo-electric diodes or transistors, which would, in turn, energize relays for controlling the indicator lights.

In operating the display system of this invention, the pilot must avoid converging his eyes on the display. Convergence should be at or near infinity at all times so that the pilot will see distant visual cues clearly. Convergence at infinity will produce separate display images for each eye with a small but adequate clearance between the images by virtue of the critical display panel width. When executing a carrier deck approach, for example, the pilot's left eye will normally be looking past the left side of the display panel while his right eye is looking through the panel with both eyes converging on the carrier deck. The display image seen by the pilot's right eye will be in line with the carrier deck and will be the one he will observe. The display image seen by the left eye will be to the right of the favored image and will normally be disregarded. In time, the undesired image is adequately subdued so that it is only vaguely noticeable.

As discussed above, the display itself has simple configurations of predominantly thermometer-type columns or sequentially activated light bulbs which usually can be adequately seen by peripheral vision. Of course, if the pilot desires more precise information than that which can be obtained peripherally, he can momentarily focus on the display and evaluate all configurations in one rapid scan without changing convergence from the carrier deck. While the pilot's eyes are focused on the display, the carrier deck, sea, sky, horizon, and so forth, retain continuity of perspective. Continuity is an important factor since the pilot obtains rate information from all of those external sources.

Obviously many modifications and variations of the present invention are possible in the light of the above teachings. For example, the display panel of this invention may be used in vehicles generally, rather than aircraft specifically. The panel has countless other applications such as in the field of medicine where a surgeon could be fitted with a means for supporting such panel in his field of view so that information relating to pulse rate, blood pressure, etc. may be displayed and conveyed to the surgeon while he is focusing on an operating point. It is therefore to be understood, that within the scope of the appended claims the invention may be practiced otherwise than as specifically described.

What is claimed and desired to be secured by Letters Patent of the United States is:

1. In an aircraft having a windscreen and instrumentation for receiving landing information, a display system for conveying the landing information to the pilot comprising:
   a display device comprising a transparent panel positioned between the pilot and the windscreen in the pilot's field of view, said transparent panel having a width of less than the interpupillary distance of the pilot,
   a plurality of light sources positioned within said transparent panel to form display configurations for indicating the position of the aircraft relative to a reference approach flight path, and
   means coupled between said aircraft instrumentation and said light sources for energizing said light sources in accordance with said landing information.

2. A system for aiding a pilot in guiding an aircraft when executing a landing approach comprising:
   means on said aircraft for providing analog signals of an amplitude indicative of the position of the aircraft relative to a reference approach path,
   a transparent display panel disposed in front of the pilot in normal field of view,
   a plurality of light sources positioned within said display panel for producing an indication of the lateral and horizontal deviation of the aircraft from the reference approach path, and
   means coupled between said means for providing analog signals and said plurality of light sources for energizing said light sources at a given brilliance and for producing an incremental variation in the number of light sources illuminated in accordance with the amplitude of said analog signals.

3. The system of claim 2 wherein said transparent panel has a width of less than the interpupillary distance between the pilot's eyes.

4. The system of claim 3 further including means for varying the brilliance of the light sources energized.

5. The system of claim 4 wherein the light sources are miniature incandescent light bulbs.

6. The system of claim 5 wherein the means coupled between said means for producing said analog signals and said plurality of light sources includes analog-to-digital converter means.

7. A display panel for conveying to an observer attitude and landing information relating to a reference approach path of an aircraft comprising:
   a transparent panel having a rectangular front face substantially parallel to a rectangular rear face, said faces having a width less than the interpupillary distance of the observer, said panel having a plurality of apertures, wherein a first group of apertures are located horizontally across the front face of said panel, a second group of apertures located vertically with respect to said first group of apertures and intersecting said first group of apertures, and a third group of apertures located on said panel face and disposed from the first and second groups of apertures, a first series of light sources positioned in said first group of apertures to form a horizontal axis for displaying the lateral deviation of the aircraft from a reference approach path, a second series of light sources positioned in said second group of apertures and intersecting said first series of light sources to form a vertical axis for displaying the vertical deviation from the reference approach path, and a plurality of light sources positioned in said third group of apertures for displaying the pitch and roll attitude of the aircraft.

8. The display panel of claim 7 wherein said third group of apertures comprises a column of apertures and a plurality of semicircular series of apertures on each side of said column, whereby the light sources in said column of apertures indicate pitch, and the light sources in said series of semicircular apertures indicate the roll attitude of the aircraft.

9. The display panel of claim 7 further including a transparent reflecting means attached to said display panel at an angle whereby said landing information is conveyed to said observer when said display panel is in a horizontal position.

10. A display panel as set forth in claim 7 wherein the light sources are miniature incandescent light bulbs of a given length.

11. A display panel as set forth in claim 10 wherein the thickness of the panel is greater than the length of the bulbs.

12. A system for conveying to an observer attitude and landing information relating to the reference approach path of an aircraft comprising:

means for providing information in the form of analog signals, said analog signals representing vertical and horizontal deviations of the aircraft together with the pitch and roll attitude of the aircraft, a transparent display panel effective in the normal field of view of the observer, said display panel having a front face substantially parallel to a rear face, said faces having a width less than the interpupillary distance of the observer, said panel having a plurality of apertures, wherein a first group of apertures are located horizontally across the front face of said panel, a second group of apertures are located vertically with respect to said first group of apertures and intersecting said first group of apertures, and a third group of apertures are located on said panel face and disposed from the first and second groups of apertures, a first series of light sources positioned in said first group of apertures to form a horizontal axis for displaying the lateral deviation of the aircraft from a reference approach path, a second series of light sources positioned in said second group of apertures and intersecting said first series of light sources to form a vertical axis for displaying the vertical deviation of the aircraft from the reference approach path, a plurality of light sources positioned in said third group of apertures for displaying the pitch and roll attitude of the aircraft, means for converting said analog signals into digital signals representative of vertical and horizontal deviations and pitch and roll attitude, means for applying the digital signals representative of vertical and horizontal deviations to said light sources in said first and second series for energizing said light sources in accordance with the amplitude of the analog signals to produce a variable optical display of the lateral and horizontal deviations of the aircraft from the reference approach path, and means for applying the digital signals representative of pitch and roll attitude to said plurality of light sources positioned in said third group of apertures for energizing said light sources in said third group so that the pitch and roll attitude of the aircraft is displayed.

13. The system as set forth in claim 12 wherein the light sources are miniature incandescent light bulbs.

14. The system of claim 12 further including means for varying the brilliance of the light sources.

15. The display system of claim 12 wherein the display panel includes in said third group of apertures a column of apertures and a plurality of semicircular series of apertures on each side of said column, whereby the light sources in said column of apertures indicate pitch, and the light sources in said semicircular series of apertures indicate the roll attitude of the aircraft.

16. The display system of claim 15 wherein the display panel is positioned in a horizontal plane in front of the observer and which further includes a reflecting means attached to said display panel at an angle for reflecting said display information into the normal field of view of the observer.

References Cited

UNITED STATES PATENTS

| | | | |
|---|---|---|---|
| 2,366,939 | 1/1945 | Smith et al. | 340—26 |
| 2,817,077 | 12/1957 | Alexander et al. | 340—27 X |
| 3,191,147 | 6/1965 | Majendie | 340—27 |
| 3,274,545 | 9/1966 | Bowles et al. | 178—7.92 X |

NEIL C. READ, *Primary Examiner.*

A. H. WARING, *Assistant Examiner.*